(Model.)

J. M. JOHNSON.
COOKING STEAMER.

No. 287,292. Patented Oct. 23, 1883.

WITNESSES:
Chas. Nida
C. Sedgwick

INVENTOR:
J. M. Johnson
BY Munn & Co.
ATTORNEYS.

UNITED STATES PATENT OFFICE.

JAMES M. JOHNSON, OF NORTHUMBERLAND, NEW HAMPSHIRE.

COOKING-STEAMER.

SPECIFICATION forming part of Letters Patent No. 287,292, dated October 23, 1883.

Application filed April 7, 1883. (Model.)

*To all whom it may concern:*

Be it known that I, JAMES M. JOHNSON, of Northumberland, in the county of Coos and State of New Hampshire, have invented a new and useful Improvement in Cooking-Steamers, of which the following is a full, clear, and exact description.

Reference is to be had to the accompanying drawings, forming a part of this specification, in which similar letters of reference indicate corresponding parts in all the figures.

Figure 3:
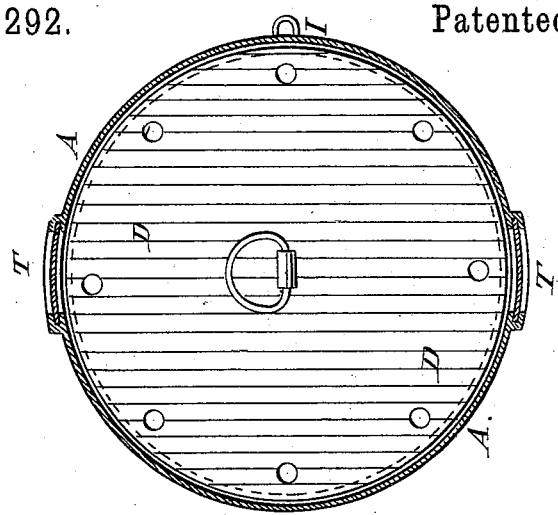
Figure 2:
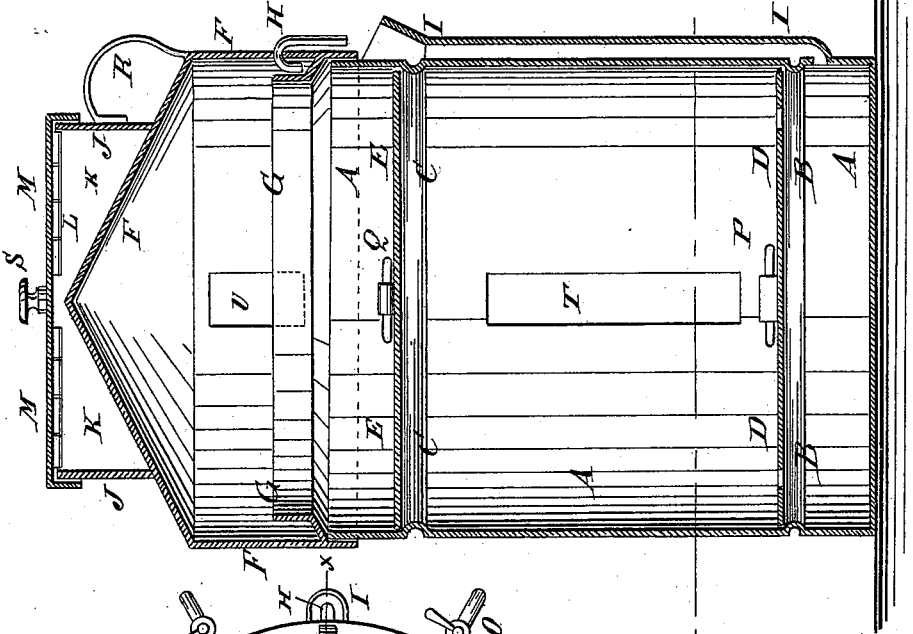
Figure 1:
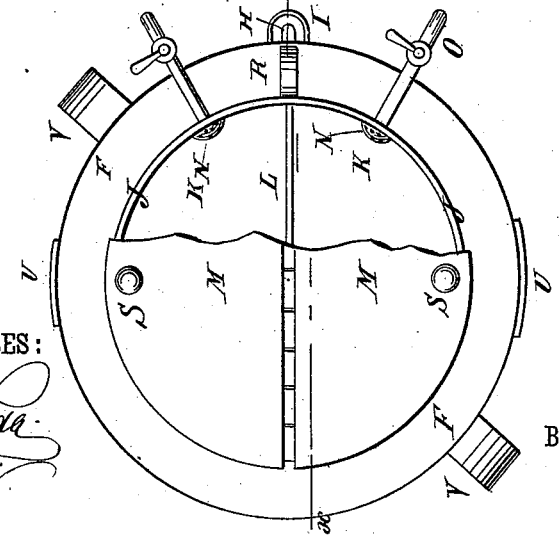

Figure 1 is a plan view of my improvement, part being broken away. Fig. 2 is a sectional side elevation of the same, taken through the line $xx$, Fig. 1. Fig. 3 is a sectional plan view of the same, taken through the line $yy$, Fig. 2.

The object of this invention is to facilitate the operation of cooking food by steam.

The invention consists in a cooking-steamer constructed with a vessel having inwardly-projecting beads near its upper and lower ends, and provided with a perforated lower partition, a close upper partition, and a water-return pipe. The cover of the vessel has a conical top, and is provided with an annular trough and a water-discharge pipe. Upon the top of the cover are two compartments, provided with wire-gauze screens and discharge-faucets. In the opposite sides of the vessel and cover are formed openings, in which are secured transparent plates, to allow the condition of the steam within the steamer to be readily inspected, as will be hereinafter fully described.

A is a cylindrical vessel, which forms the lower part of the body of my improved steamer. In the side walls of the vessel A, at a distance of two or three inches from its bottom and top, are formed inwardly-projecting beads B C, to serve as cleats or flanges to receive and support the partitions D E, upon which are placed the substances to be cooked. The lower partition, D, has a number of perforations formed through it, to allow the steam-generator in the lower part of the vessel A to pass freely into the space above the said partition D. The upper partition, E, is made without perforations, so that the steam can enter the space above the partition E only by raising the said partition and passing up around its edges, the partition E thus serving as a valve, and causing the cooking to be done with steam under a slight compression.

F is the upper part or cover of the steamer, the lower edge of which fits snugly around the upper edge of the lower part, A, and the top of which is made conical, as shown in Fig. 2.

To the inner surface of the side walls of the cover F, at a little distance from their lower edge, is secured a flange, G, forming a channel or trough, to receive the water of condensation, and which also serves as a shoulder to rest upon the upper edge of the vessel A and support the said cover.

In a hole in the side of the cover F, at a little distance from its lower edge, is placed a siphon, H, the short arm of which extends nearly to the bottom of the trough or channel G, and its long arm extends downward at the outside of the said cover F, so as to discharge the outflowing water of condensation into the flaring or funnel-shaped upper end of the pipe I, secured to the outside of the vessel A, the lower end of which is connected with an aperture in the side of the said vessel A below the lower bead, B, so that the water of condensation will flow back into the steam-generating chamber.

To the conical top of the cover F is secured the lower edge of an annular flange, J, of a less diameter than the said cover. The space within the flange J is divided into two compartments, K, by a vertical partition, L, to the upper edge of which are hinged the straight edges of two semicircular lids, M. Each compartment K is provided with a discharge-orifice, which is covered upon the inner side with a wire-gauze screen, N, and within which is secured a faucet, O, to adapt the said compartments to be used for making tea and coffee when desired.

The vessel A, the partitions D E, the cover F, and the lids M are provided, respectively, with handles V P Q R S, for convenience in applying and removing the said parts.

In the opposite sides of the vessel A and of the cover F are formed openings, in which are secured plates T U, of glass or other suitable transparent material, to allow the operator to see whether the said chambers are filled with live steam or with partially-condensed steam, so that he can properly regulate the application of heat.

In using the steamer, water to the depth of one or two inches is poured in the vessel A, and the said vessel is placed over an oil-stove or other suitable heat-producer. The substance to be cooked is then placed in the steamer, the cover F is put on, and cold water is put into the compartments K, so that the steam will be condensed by the contact of the air with the walls of the steamer and by the water in the compartments K, which water, when heated, can be drawn off and replaced by cold water.

If desired, one of the compartments K can be used for making tea or coffee, while the other is kept supplied with cold water.

With this construction the cooking will be done with live steam under pressure, so that the substance being cooked will not become soggy or water-soaked, and will be quickly and thoroughly cooked.

Having thus fully described my invention, I claim as new and desire to secure by Letters Patent—

A cooking-steamer constructed substantially as herein shown and described, and consisting of the vessel A, having inwardly-projecting beads B C, and provided with the perforated partition D, the close partition E, and the pipe I, and of the cover F, having conical top, and provided with the trough G and pipe H, and the top compartments, K, provided with the faucets O, as set forth.

JAMES M. JOHNSON.

Witnesses:
J. W. FLANDERS,
C. A. CLEAVELAND.